US012114806B2

(12) United States Patent
Zhang

(10) Patent No.: US 12,114,806 B2
(45) Date of Patent: Oct. 15, 2024

(54) STEAM-TYPE AIR FRYER

(71) Applicant: NINGBO CARELINE ELECTRIC APPLIANCE CO., LTD., Ningbo (CN)

(72) Inventor: Yichi Zhang, Ningbo (CN)

(73) Assignee: NINGBO CARELINE ELECTRIC APPLIANCE CO., LTD., Ningbo (CN)

(*) Notice: Subject to any disclaimer, the term of this patent is extended or adjusted under 35 U.S.C. 154(b) by 685 days.

(21) Appl. No.: 17/147,432

(22) Filed: Jan. 12, 2021

(65) Prior Publication Data

US 2022/0053972 A1 Feb. 24, 2022

(30) Foreign Application Priority Data

Aug. 19, 2020 (CN) .......................... 202021735532.7
Aug. 19, 2020 (CN) .......................... 202021735566.6
Aug. 19, 2020 (CN) .......................... 202021735585.9

(51) Int. Cl.
*A47J 37/06* (2006.01)
*A47J 27/00* (2006.01)
(Continued)

(52) U.S. Cl.
CPC ......... *A47J 37/0641* (2013.01); *A47J 27/002* (2013.01); *A47J 27/04* (2013.01); *A47J 36/06* (2013.01); *A47J 2027/043* (2013.01)

(58) Field of Classification Search
CPC A47J 27/002; A47J 27/04; A47J 36/06; A47J 36/0641; A47J 2027/043
(Continued)

(56) References Cited

U.S. PATENT DOCUMENTS

2018/0035698 A1* 2/2018 McNerney ................ A23L 5/17
2020/0022531 A1* 1/2020 Man ..................... A47J 37/0641

FOREIGN PATENT DOCUMENTS

CN      107711937 A     2/2018
CN      110074690 A  *  8/2019      ............ A47J 27/04
(Continued)

OTHER PUBLICATIONS

CN 111214131 A—Translation (Year: 2020).*
(Continued)

*Primary Examiner* — Steven B McAllister
*Assistant Examiner* — Benjamin W Johnson
(74) *Attorney, Agent, or Firm* — Platinum Intellectual Property

(57) ABSTRACT

Disclosed is a steam-type air fryer including a main body. A chamber is disposed in the main body. A heating element is disposed in the main body. An air duct plate is disposed on an upper side of the chamber. A hot air wind wheel and a heating tube are disposed in the air duct plate. The steam-type air fryer further includes a door sealing structure, wherein an openable door panel and a door frame are disposed on a side of the air fryer. An opening is provided in a side of the chamber facing the door panel. A second sealing ring is mounted between the door frame and the door panel. The steam-type air fryer further includes a water tank mounted at the top of the steam-type air fryer and including a water tank body and a top cover located on the top of the water tank body.

13 Claims, 7 Drawing Sheets

(51) Int. Cl.
 *A47J 27/04* (2006.01)
 *A47J 36/06* (2006.01)
(58) Field of Classification Search
 USPC .......................................................... 126/369
 See application file for complete search history.

(56) References Cited

FOREIGN PATENT DOCUMENTS

CN 111214131 A * 6/2020
CN 210784028 U * 6/2020

OTHER PUBLICATIONS

CN 210784028 U—Translation (Year: 2020).*
CN 110074690 A—Translation (Year: 2019).*
Decision to Grant a Patent of EPO family application.
English Abstract of cited patent documents.
ESR of EPO family application.
Notice of Granting Priority Right of Utility Model Patent Right CN2020217355327.
Notice of Granting Priority Right of Utility Model Patent Right CN2020217355666.
Notice of Granting Priority Right of Utility Model Patent Right CN2020217355859.

* cited by examiner

STEAM-TYPE AIR FRYER

CROSS-REFERENCE TO RELATED APPLICATIONS

This application claims priority to Chinese Patent Application No. 202021735566.6 filed with the Chinese Patent Office on Aug. 19, 2020, entitled "Steam-type Air Fryer with Good Airtightness", Chinese Patent Application No. 202021735532.7 filed with the Chinese Patent Office on Aug. 19, 2020, entitled "Door Sealing Structure for Steam-type Air Fryer", and Chinese Patent Application No. 202021735585.9 filed with the Chinese Patent Office on Aug. 19, 2020, entitled "Steam-type Air Fryer Allowing Easy Addition of Water", which are incorporated herein by reference in their entireties.

TECHNICAL FIELD

The present disclosure relates to the field of air fryers, in particular to a steam-type air fryer, and more specifically to a steam-type air fryer comprising a door sealing structure with good airtightness and allowing easy addition of water.

BACKGROUND ART

An air fryer is an electric kitchen appliance that is now very popular with people. The prior art air fryers generally only have the air frying function and cook food in a relatively simple manner and thus cannot meet the diverse needs of users. For this reason, a steam-type air fryer having both air frying and steam cooking functions has been commercially available, but it has the following common problems:

1) High airtightness is required in steam cooking, otherwise there is a risk of air leakage. Specifically, a chamber inside an air fryer in which food can be placed should be welded and sealed before it is put in the assembly line, and an air duct plate is firstly assembled together with components such as an upper core and a motor, and then assembled to the chamber. Since a main wind wheel of the air fryer is mounted at its upper part, there will be a sealing problem in mounting of the air duct plate to the chamber.

2) High airtightness is required in steam cooking, otherwise there is a risk of air leakage. Specifically, high airtightness is required between a door frame and a door panel of the air fryer during steam cooking, otherwise there is a risk of air leakage.

3) It is not convenient to add water to its water tank, resulting in poor user experience.

SUMMARY

The following technical solutions are disclosed in the present disclosure.

A steam-type air fryer, comprising a main body, wherein a chamber in which food can be placed is disposed in the main body, a heating element for heating water into hot steam and introducing the hot steam into the chamber is disposed in the main body, an air duct plate is disposed on an upper side of the chamber, and a hot air wind wheel and a heating tube are disposed in the air duct plate, wherein the upper side of the chamber has an opening and is hermetically connected with the air duct plate, and a front side of the chamber is open and is hermetically fitted with a door panel, so that the entire chamber is formed as an integral sealed structure;

the steam-type air fryer further includes a door sealing structure, wherein an openable door panel and a door frame matching the door panel are disposed on a side of the air fryer, an opening through which food is placed and removed is provided in a side of the chamber facing the door panel, and a second sealing ring is mounted between the door frame and the door panel, so that steam in the chamber will not leak from its opening; and the steam-type air fryer further includes a water tank, which is mounted at the top of the steam-type air fryer and which includes a water tank body and an openable top cover located on the top of the water tank body.

BRIEF DESCRIPTION OF DRAWINGS

In order to more clearly illustrate technical solutions of embodiments of the present disclosure, drawings required for use in the embodiments will be described briefly below. It is to be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

REFERENCE NUMERALS

Figure 1:
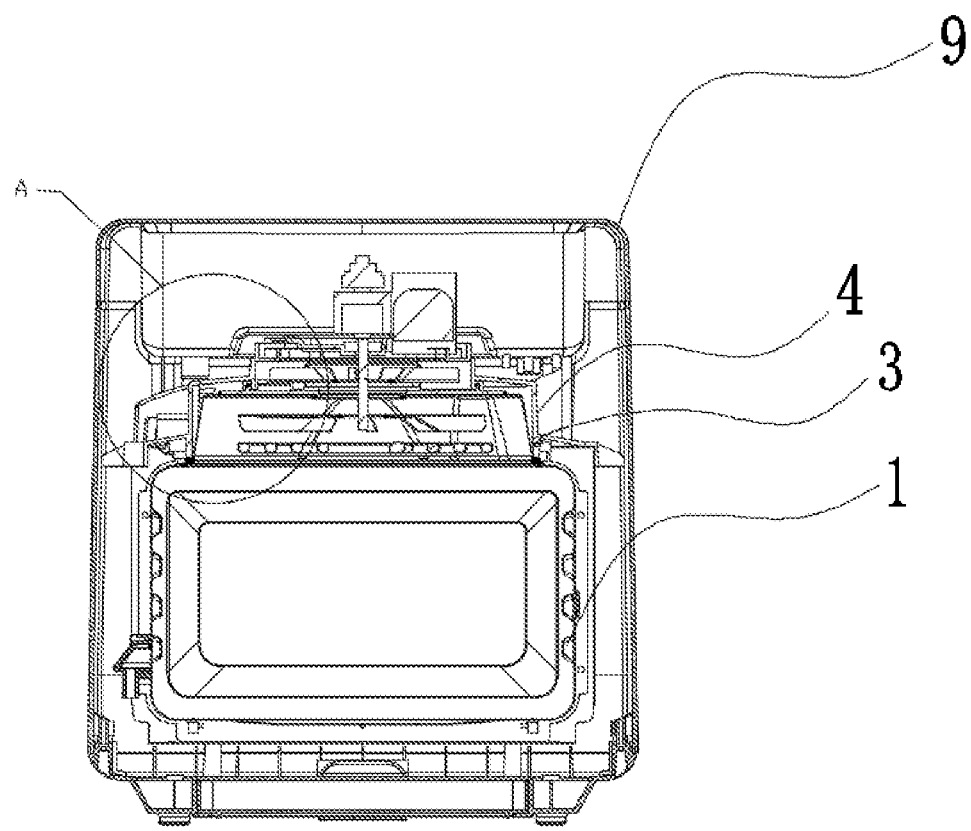
FIG. 1 is a front half-sectional structural view of a steam-type air fryer of the present disclosure.
Figure 2:
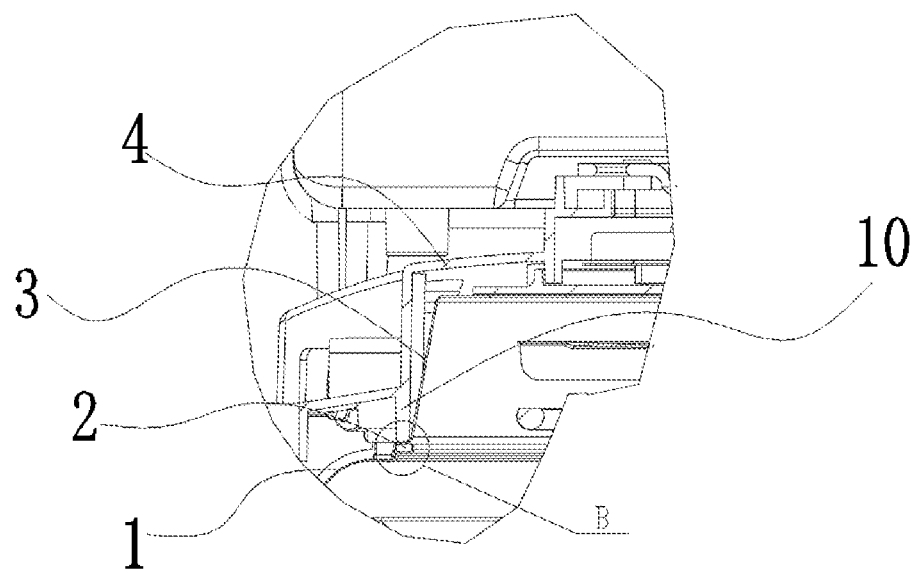
FIG. 2 is an enlarged structural view of part A of FIG. 1.
Figure 3:
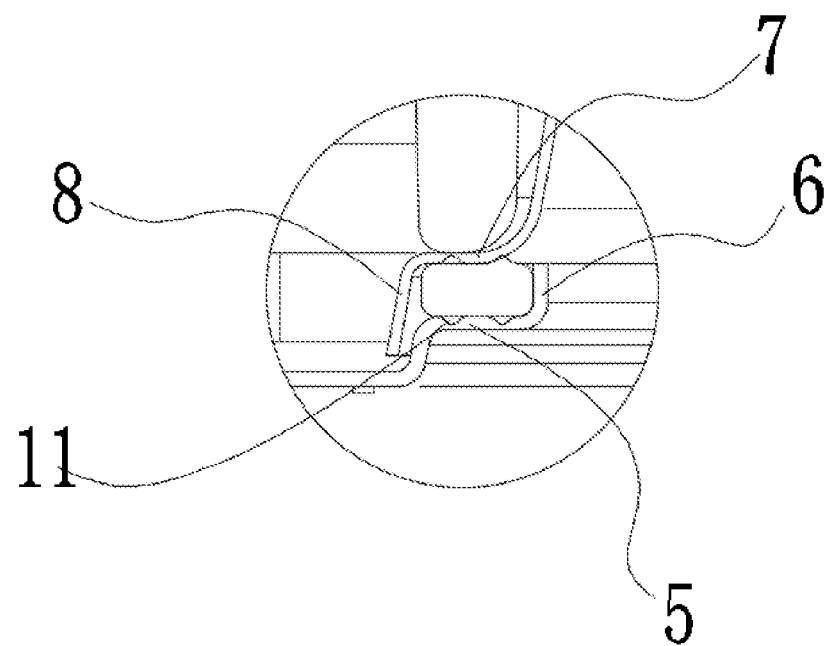
FIG. 3 is an enlarged structural view of part B of FIG. 2.
Figure 4:
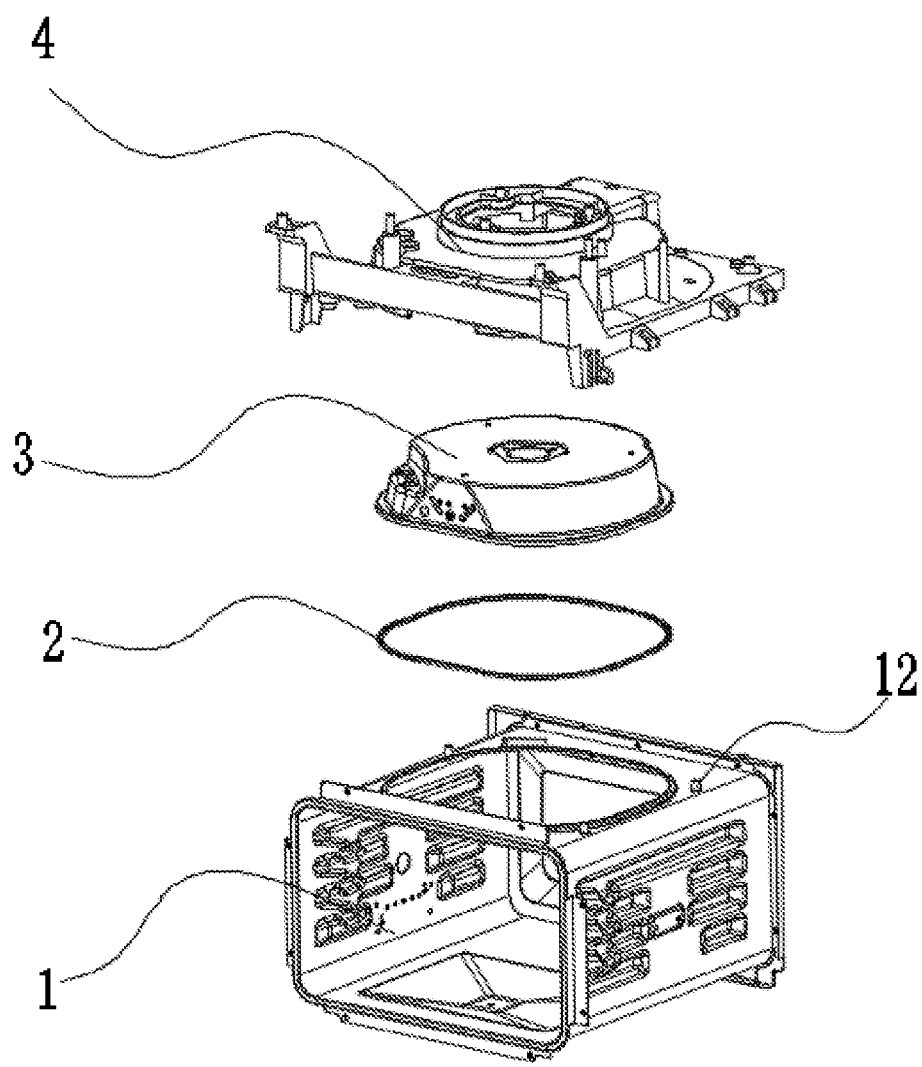
FIG. 4 is an exploded perspective structural view of the steam-type air fryer of the present disclosure.
Figure 5:
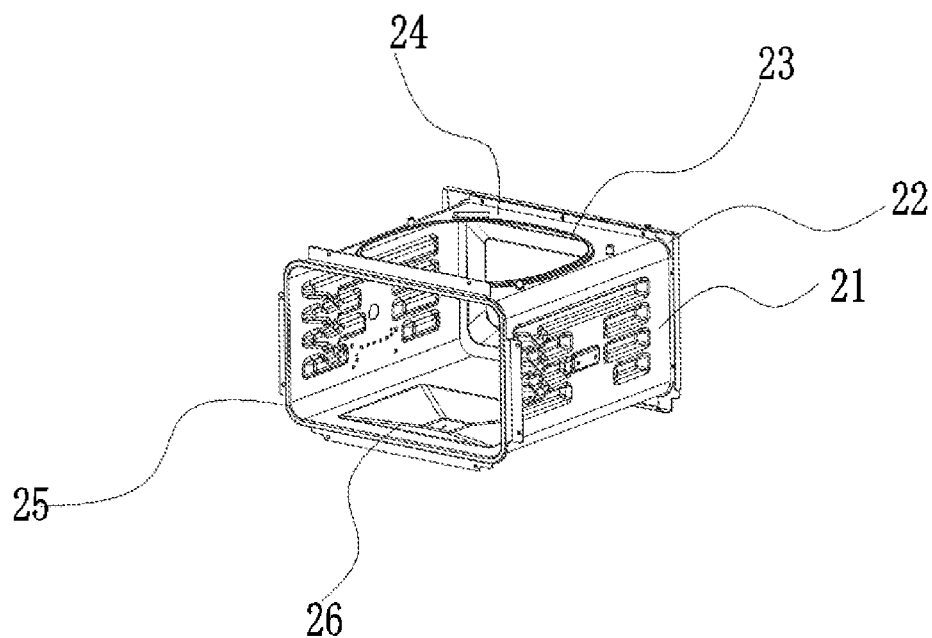
FIG. 5 is a structural view of a chamber of the steam-type air fryer of the present disclosure.

1—chamber; 2—first sealing ring; 3—air duct plate; 4—upper core; 5—chamber step; 6—upward flange portion; 7—air duct plate step; 8—downward flange portion; 9—main body; 10—pressure plate; 11—rib; 12—welded nut; 21—side plate; 22—back plate; 23—upper opening; 24—top plate; 25—open hole; 26—bottom plate; 02—door panel; 03—transparent window glass panel; 04—second sealing ring; 05—metal frame; 06—flange portion; 07—door frame; 08—limiting groove; 010—sealing lip; 011—limiting portion; 012—folded edge portion; 013—bevel portion; 014—second sealing lip; 015—first sealing lip; 001—top surface; 002—water tank; 003—inwardly recessed portion; 004—grip flange; 005—water tank body; 006—top cover; 007—hinge base; 008—rotating shaft.

DETAILED DESCRIPTION OF EMBODIMENTS

In order to further clarify the objectives, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations.

Thus, the following detailed description of the embodiments of the present disclosure, as represented in the figures, is not intended to limit the scope of the present disclosure as claimed, but is merely representative of selected embodiments of the present disclosure. All the other embodiments obtained by those of ordinary skill in the art in light of the embodiments of the present disclosure without inventive efforts will fall within the scope of the present disclosure as claimed.

It should be noted that similar reference numerals and letters refer to similar items in the following figures, and thus once an item is defined in one figure, it may not be further defined or explained in the following figures.

In the description of the present disclosure, it should be noted that the terms such as "up", "down", "inside", and "outside", if present, indicate the orientation or positional relationships shown based on the figures, or the orientation or positional relationships in which the inventive product is conventionally placed in use, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure. In addition, terms such as "first" and "second", if present, are used for distinguishing the description only, and should not be understood as an indication or implication of relative importance.

In addition, the term "horizontal", "vertical", "overhanging", or the like means that a component may be slightly inclined, rather than being required to be absolutely horizontal or overhanging. For example, by the term "horizontal", it is simply meant that its direction is more horizontal than the term "vertical", and it is not meant that the structure must be completely horizontal, but it is meant that the structure may be slightly inclined.

In the description of the present disclosure, it should also be noted that the terms "provide", "mount", "link", and "connect" should be understood broadly unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

It should be noted that the features in the embodiments of the present disclosure may be combined with each other without conflict.

The present disclosure provides an air fryer in order to solve at least one of the above-mentioned technical problems.

The following technical solutions are disclosed in the present disclosure.

A steam-type air fryer, comprising a main body, wherein a chamber in which food can be placed is disposed in the main body, a heating element for heating water into hot steam and introducing the hot steam into the chamber is disposed in the main body, an air duct plate is disposed on an upper side of the chamber, and a hot air wind wheel and a heating tube are disposed in the air duct plate, wherein the upper side of the chamber has an opening and is hermetically connected with the air duct plate, and a front side of the chamber is open and is hermetically fitted with a door panel, so that the entire chamber is formed as an integral sealed structure;

the steam-type air fryer further includes a door sealing structure, wherein an openable door panel and a door frame matching the door panel are disposed on a side of the air fryer, an opening through which food is placed and removed is provided in a side of the chamber facing the door panel, and a second sealing ring is mounted between the door frame and the door panel, so that steam in the chamber will not leak from its opening; and the steam-type air fryer further includes a water tank, which is mounted at the top of the steam-type air fryer and which includes a water tank body and an openable top cover located on the top of the water tank body.

In one or more embodiments, the chamber includes a chamber body consisting of a top plate, a bottom plate, and side plates, which are integrally molded, wherein a front side of the chamber body is an open hole that is hermetically fitted with the door panel, a rear side of the chamber body is connected to a back plate in a manner of hermetical welding, and the top plate on the upper side is provided with an upper opening which matches the contour of a lower end of the air duct plate.

In one or more embodiments, a first sealing ring is mounted between the upper side of the chamber and the air duct plate to achieve a sealed connection therebetween.

In one or more embodiments, at least one rib is disposed on each of surfaces of the first sealing ring corresponding to the chamber and the air duct plate.

In one or more embodiments, the upper end of the chamber is provided with a circle of chamber step along the opening, an upward flange portion is disposed on an inner side of the chamber step, the first sealing ring is placed on the chamber step and is positionally limited by the upward flange portion, and a lower end of the air duct plate is pressed against the first sealing ring.

In one or more embodiments, the lower end of the air duct plate is provided with a circle of air duct plate step along its opening, a downward flange portion is disposed on an outer side of the air duct plate step, and the air duct plate step is pressed against the first sealing ring.

In one or more embodiments, the upper core is provided with a downwardly extending pressure plate which is pressed against the air duct plate step.

In one or more embodiments, the upper core is connected fixedly to welded nuts on the upper side of the chamber by screws.

In one or more embodiments, the upper end of the chamber has an opening at which an adhesive layer is disposed to achieve a sealed connection between the chamber and the air duct plate.

In one or more embodiments, the second sealing ring includes two sealing lips, which are a first sealing lip extending toward a center of the door panel and a second sealing lip extending toward an edge of the door panel, respectively, wherein both the first sealing lip and the second sealing lip are in contact with the door panel.

In one or more embodiments, one side of the second sealing ring is sandwiched between the door frame and the opening of the chamber.

In one or more embodiments, a flange portion is provided at the opening of the chamber, and one side of the second sealing ring is sandwiched between the flange portion and the door frame.

In one or more embodiments, one side of the second sealing ring is provided with a limiting portion having a hook-shaped section, an inner side of the door frame is provided with a limiting groove, the limiting portion is sandwiched between the flange portion and the door frame, and the limiting portion has an end portion embedded in the limiting groove.

In one or more embodiments, a transparent window glass panel is disposed in the door panel.

In one or more embodiments, an inner side of the door panel is provided with a metal frame for fixing the transparent window glass panel.

In one or more embodiments, the metal frame has an outer edge and an inner edge each provided with a folded edge portion, the folded edge portion located at the outer edge is engaged with the inner side of the door panel, and the folded edge portion located at the inner edge is pressed against the transparent window glass panel.

In one or more embodiments, the first sealing lip of the second sealing ring is in hermetical contact with the metal frame.

In one or more embodiments, one side of the top cover is rotatably connected to the water tank body.

In one or more embodiments, one side of the top cover has both ends each provided with a hinge base, into which a rotating shaft provided at each end of the water tank body is inserted.

In one or more embodiments, a grip flange is provided to protrude from the edge of the other side of the top cover, and an inwardly recessed portion corresponding to the grip flange is provided in a top surface of the air fryer.

A door sealing structure for a steam-type air fryer is disclosed, wherein the air fryer is provided with a chamber in which food can be placed, wherein an openable door panel and a door frame matching the door panel are disposed on a side of the air fryer, an opening through which food is placed and removed is provided in a side of the chamber facing the door panel, and a second sealing ring is mounted between the door frame and the door panel, so that steam in the chamber will not leak from its opening.

In one or more embodiments, the second sealing ring includes two sealing lips, which are a first sealing lip extending toward a center of the door panel and a second sealing lip extending toward an edge of the door panel, respectively, wherein both the first sealing lip and the second sealing lip are in contact with the door panel.

In one or more embodiments, one side of the second sealing ring is sandwiched between the door frame and the opening of the chamber.

In one or more embodiments, a flange portion is provided at the opening of the chamber, and one side of the second sealing ring is sandwiched between the flange portion and the door frame.

In one or more embodiments, one side of the second sealing ring is provided with a limiting portion having a hook-shaped section, an inner side of the door frame is provided with a limiting groove, the limiting portion is sandwiched between the flange portion and the door frame, and the limiting portion has an end portion embedded in the limiting groove.

In one or more embodiments, a transparent window glass panel is disposed in the door panel.

In one or more embodiments, an inner side of the door panel is provided with a metal frame for fixing the transparent window glass panel.

In one or more embodiments, the metal frame has an outer edge and an inner edge each provided with a folded edge portion, the folded edge portion located at the outer edge is engaged with the inner side of the door panel, and the folded edge portion located at the inner edge is pressed against the transparent window glass panel.

In one or more embodiments, the first sealing lip of the second sealing ring is in hermetical contact with the metal frame.

In one or more embodiments, the metal frame has a section provided with a bevel portion in its middle portion, and the first sealing lip is hermetically fitted to the bevel portion.

A steam-type air fryer with good airtightness includes a main body, wherein a chamber in which food can be placed is disposed in the main body, a heating element for heating water into hot steam and introducing the hot steam into the chamber is disposed in the main body, an air duct plate is disposed on an upper side of the chamber, and a hot air wind wheel and a heating tube are disposed in the air duct plate, wherein the upper side of the chamber has an opining and is hermetically connected with the air duct plate, and a front side of the chamber is open and is hermetically fitted with a door panel, so that the entire chamber is formed as an integral sealed structure.

In one or more embodiments, the chamber includes a chamber body consisting of a top plate, a bottom plate, and side plates, which are integrally molded, wherein a front side of the chamber body is an open hole that is hermetically fitted with the door panel, a rear side of the chamber body is connected to a back plate in a manner of hermetical welding, and the top plate on the upper side is provided with an upper opening which matches the contour of a lower end of the air duct plate.

In one or more embodiments, a first sealing ring is mounted between the upper side of the chamber and the air duct plate to achieve a sealed connection therebetween.

In one or more embodiments, at least one rib is disposed on each of surfaces of the first sealing ring corresponding to the chamber and the air duct plate.

In one or more embodiments, the upper end of the chamber is provided with a circle of chamber step along its opening, an upward flange portion is disposed on an inner side of the chamber step, the first sealing ring is placed on the chamber step and is positionally limited by the upward flange portion, and a lower end of the air duct plate is pressed against the first sealing ring.

In one or more embodiments, the lower end of the air duct plate is provided with a circle of air duct plate step along its opening, a downward flange portion is disposed on an outer side of the air duct plate step, and the air duct plate step is pressed against the first sealing ring.

In one or more embodiments, the upper core is provided with a downwardly extending pressure plate which is pressed against the air duct plate step.

In one or more embodiments, the upper core is connected fixedly to welded nuts on the upper side of the chamber by screws.

In one or more embodiments, the upper end of the chamber has an opening at which an adhesive layer is disposed to achieve a sealed connection between the chamber and the air duct plate.

A steam-type air fryer allowing easy addition of water is disclosed, wherein a water tank is mounted at the top of the air fryer, wherein the water tank includes a water tank body and an openable top cover located on the top of the water tank body.

In one or more embodiments, one side of the top cover is rotatably connected to the water tank body.

In one or more embodiments, one side of the top cover has both ends each provided with a hinge base, into which a rotating shaft provided at each end of the water tank body is inserted.

In one or more embodiments, a grip flange is provided to protrude from the edge of the other side of the top cover, and an inwardly recessed portion corresponding to the grip flange is provided in a top surface of the air fryer.

In one or more embodiments, the top cover is flush with the top surface of the air fryer when closed.

In one or more embodiments, the water tank is detachably connected to the air fryer and can be wholly removed from the top of the air fryer.

In one or more embodiments, the water tank body is provided as a transparent structure.

The present disclosure provides a steam-type air fryer with good airtightness, having a chamber well sealed and an air duct plate well sealed to the chamber.

In order to achieve the above objective, the present disclosure provides the following technical solution. A steam-type air fryer with good airtightness includes a main body, wherein a chamber in which food can be placed is disposed in the main body, a heating element for heating water into hot steam and introducing the hot steam into the chamber is disposed in the main body, an air duct plate is disposed on an upper side of the chamber, a hot air wind wheel and a heating tube are disposed in the air duct plate, the upper side of the chamber has an opining and is hermetically connected with the air duct plate, and a front side of the chamber is open and is hermetically fitted with a door panel, so that the entire chamber is formed as an integral sealed structure.

In one or more embodiments, the chamber includes a chamber body consisting of a top plate, a bottom plate, and side plates, which are integrally molded, wherein a front side of the chamber body is an open hole that is hermetically fitted with the door panel, a rear side of the chamber body is connected to a back plate in a manner of hermetical welding, and the top plate on the upper side is provided with an upper opening which matches the contour of a lower end of the air duct plate.

In one or more embodiments, a first sealing ring is mounted between the upper side of the chamber and the air duct plate to achieve a sealed connection therebetween.

In one or more embodiments, at least one rib is disposed on each of surfaces of the first sealing ring corresponding to the chamber and the air duct plate.

In one or more embodiments, the upper end of the chamber has an opening and is provided with a circle of chamber step along the opening, an upward flange portion is disposed on an inner side of the chamber step, the first sealing ring is placed on the chamber step and is positionally limited by the upward flange portion, and a lower end of the air duct plate is pressed against the first sealing ring.

In one or more embodiments, the lower end of the air duct plate is provided with a circle of air duct plate step along its opening, a downward flange portion is disposed on an outer side of the air duct plate step, and the air duct plate step is pressed against the first sealing ring.

In one or more embodiments, the upper core is provided with a downwardly extending pressure plate which is pressed against the air duct plate step.

In one or more embodiments, the upper core is connected fixedly to welded nuts on the upper side of the chamber by screws.

In one or more embodiments, the upper end of the chamber has an opening at which an adhesive layer is disposed to achieve a sealed connection between the chamber and the air duct plate.

The steam-type air fryer with good airtightness according to the present disclosure has the following advantageous effects compared with the prior art.

The chamber is in an integral welded and sealed structure, and a reliable sealing structure is disposed between the chamber and the air duct plate, so as to ensure airtightness.

The present disclosure also provides a door sealing structure for a steam-type air fryer, by which a door frame and a door panel of the air fryer can be sealed to each other to ensure airtightness of the steam-type air fryer.

In order to achieve the above objective, the present disclosure provides following technical solution: a door sealing structure for a steam-type air fryer, wherein the air fryer is provided with a chamber in which food can be placed, an openable door panel and a door frame matching the door panel are disposed on a side of the air fryer, an opening through which food is placed and removed is provided in a side of the chamber facing the door panel, and a second sealing ring is mounted between the door frame and the door panel, so that steam in the chamber will not leak from its opening.

In one or more embodiments, the second sealing ring includes two sealing lips, which are a first sealing lip extending toward a center of the door panel and a second sealing lip extending toward an edge of the door panel, respectively, wherein both the first sealing lip and the second sealing lip are in contact with the door panel.

In one or more embodiments, one side of the second sealing ring is sandwiched between the door frame and the opening of the chamber.

In one or more embodiments, a flange portion is provided at the opening of the chamber, and one side of the second sealing ring is sandwiched between the flange portion and the door frame.

In one or more embodiments, one side of the second sealing ring is provided with a limiting portion having a hook-shaped section, an inner side of the door frame is provided with a limiting groove, the limiting portion is sandwiched between the flange portion and the door frame, and the limiting portion has an end portion embedded in the limiting groove.

In one or more embodiments, a transparent window glass panel is disposed in the door panel.

In one or more embodiments, an inner side of the door panel is provided with a metal frame for fixing the transparent window glass panel.

In one or more embodiments, the metal frame has an outer edge and an inner edge each provided with a folded edge portion, the folded edge portion located at the outer edge is engaged with the inner side of the door panel, and the folded edge portion located at the inner edge is pressed against the transparent window glass panel.

In one or more embodiments, the first sealing lip of the second sealing ring is in hermetical contact with the metal frame.

In one or more embodiments, the metal frame has a section provided with a bevel portion in its middle portion, and the first sealing lip is hermetically fitted to the bevel portion.

The door sealing structure for a steam-type air fryer of the present disclosure has the following advantageous effects compared with the prior art:

1. A second sealing ring is mounted between the door frame and the door panel to achieve a sealed fit therebetween, so as to ensure airtightness of the steam-type air fryer.

2. The second sealing ring includes two sealing lips. The two sealing lips are both in contact with the door panel to serve as double seals.

3. The inner side of the door panel includes a transparent window glass panel and a metal frame for fixing the glass, which allows for visualization and easy cleaning.

4. The sealing lip of the second sealing ring is hermetically fitted to the metal frame and can serve the function of isolating heat transfer between the metal frame and the plastic material.

The present disclosure also provides a steam-type air fryer allowing easy addition of water, comprising a water tank with a top cover openable, to allow easy addition of water, so as to improve user experience.

In order to achieve the above objective, the present disclosure provides following technical solution: a steam-type air fryer allowing easy addition of water, wherein a water tank is mounted at the top of the air fryer, and the water tank includes a water tank body and an openable top cover located on the top of the water tank body.

In one or more embodiments, one side of the top cover is rotatably connected to the water tank body.

In one or more embodiments, one side of the top cover has both ends each provided with a hinge base, into which a rotating shaft provided at each end of the water tank body is inserted.

In one or more embodiments, a grip flange is provided to protrude from the edge of the other side of the top cover, and an inwardly recessed portion corresponding to the grip flange is provided in a top surface of the air fryer.

In one or more embodiments, the top cover is flush with the top surface of the air fryer when closed.

In one or more embodiments, the water tank is detachably connected to the air fryer and can be wholly removed from the top of the air fryer.

In one or more embodiments, the water tank body is provided as a transparent structure.

The steam-type air fryer allowing easy addition of water according to the present disclosure has the following advantageous effects compared with the prior art.

1. The water tank of the steam-type air fryer includes a water tank body and a detachable top cover. The top cover can be opened quickly, so that the water tank can be easily filled with water without being removed.

2. The water tank cover is provided with a rotating shaft structure and is hinged to the water tank body by means of the rotating shaft structure of the water tank.

3. A grip position is provided to protrude from one side of the top cover of the water tank for easy opening of the top cover. In addition, the upper shell of the air fryer is provided with a clearance portion corresponding to the grip position, so that a user can reach into the clearance portion to operate the grip position to easily and quickly open the top cover.

4. The water tank is in a detachable structure and can be wholly removed from the upper shell of the air fryer, so as to be cleaned easily. Moreover, the water tank body may be provided as a transparent structure, which allows easy and quick observation of the remaining water volume.

The embodiments of the present disclosure will be described below in further detail with reference to the accompanying drawings.

As shown in FIGS. 1 to 5, the present disclosure provides a steam-type air fryer with good airtightness, which includes a main body 9. A chamber 1 in which food can be placed is disposed in the main body 9. A heating element for heating water into hot steam and introducing the hot steam into the chamber 1 is disposed in the main body 9. An air duct plate 3 is disposed on an upper side of the chamber 1. A hot air wind wheel and a heating tube are disposed in the air duct plate 3. The upper side of the chamber 1 has an opening and is hermetically connected with the air duct plate 3, and a front side of the chamber 1 is open and is hermetically fitted with a door panel, so that the entire chamber 1 is formed as an integral sealed structure.

Example 1

As a specific structure of the chamber 1, the chamber 1 includes a chamber body consisting of a top plate 24, a bottom plate 26, and side plates 21, which are integrally molded. A front side of the chamber body is an open hole 25 that is hermetically fitted with the door panel. A rear side of the chamber body is connected to a back plate 22 in a manner of hermetical welding. The top plate 24 on the upper side is provided with an upper opening 23 which matches the contour of a lower end of the air duct plate 3. In this way, the whole chamber 1 is sealed by sealing the chamber body and the front and rear sides thereof, and the upper side of the chamber 1 is sealed by its sealed connection with the air duct plate 3.

Example 2

A first sealing ring 2 is mounted between the upper side of the chamber 1 and the air duct plate 3 to achieve a sealed connection therebetween, wherein at least one rib 11 is disposed on each of surfaces of the first sealing ring 2 corresponding to the chamber 1 and the air duct plate 3 in order to improve airtightness.

The first sealing ring 2 is mounted in such a manner that the upper end of the chamber 1 has an opening and is provided with a circle of chamber step 5 along the opening, an upward flange portion 6 is disposed on an inner side of the chamber step 5, the first sealing ring 2 is placed on the chamber step 5 and is positionally limited by the upward flange portion 6, and a lower end of the air duct plate 3 is pressed against the first sealing ring 2.

Moreover, the lower end of the air duct plate 3 is provided with a circle of air duct plate step 7 along its opening. A downward flange portion 8 is disposed on an outer side of the air duct plate step 7. The air duct plate step 7 is pressed against the first sealing ring 2. In this way, the first sealing ring 2 can be positionally limited by the chamber step 5, the upward flange portion 6, the air duct plate step 7, and the downward flange portion 8, so that good airtightness is obtained.

In order to further improve airtightness, the upper core 4 is provided with a downwardly extending pressure plate 10 which is pressed against the air duct plate step 7.

The upper core 4 is connected fixedly to welded nuts 12 on the upper side of the chamber 1 by screws. The pressure plate 10 can be pressed against the air duct plate step 7 during mounting.

Example 3

The upper end of the chamber 1 has an opening, at which a liquid sealant is provided to achieve a sealed connection between the chamber 1 and the air duct plate 3, as long as it is ensured that the chamber 1 is filled with enough liquid sealant at a position in contact with the air duct plate 3.

Figure 6:
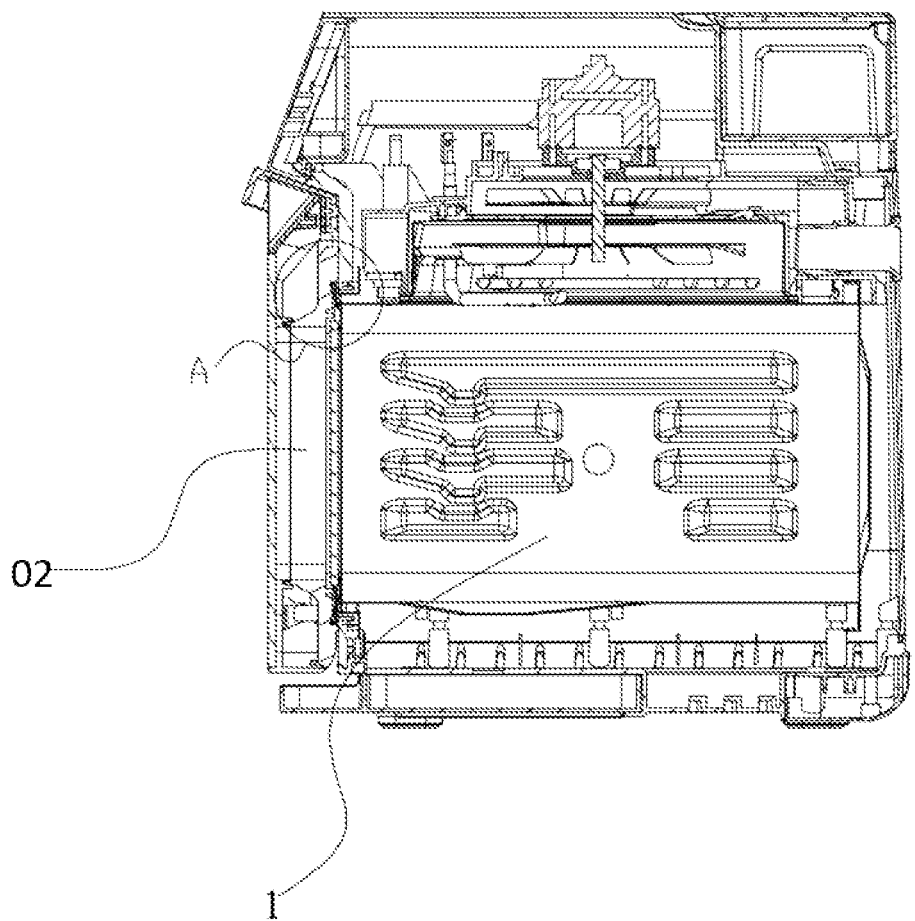
FIG. 6 is a front half-sectional structural view of a door sealing structure of a steam-type air fryer of the present disclosure.
Figure 7:
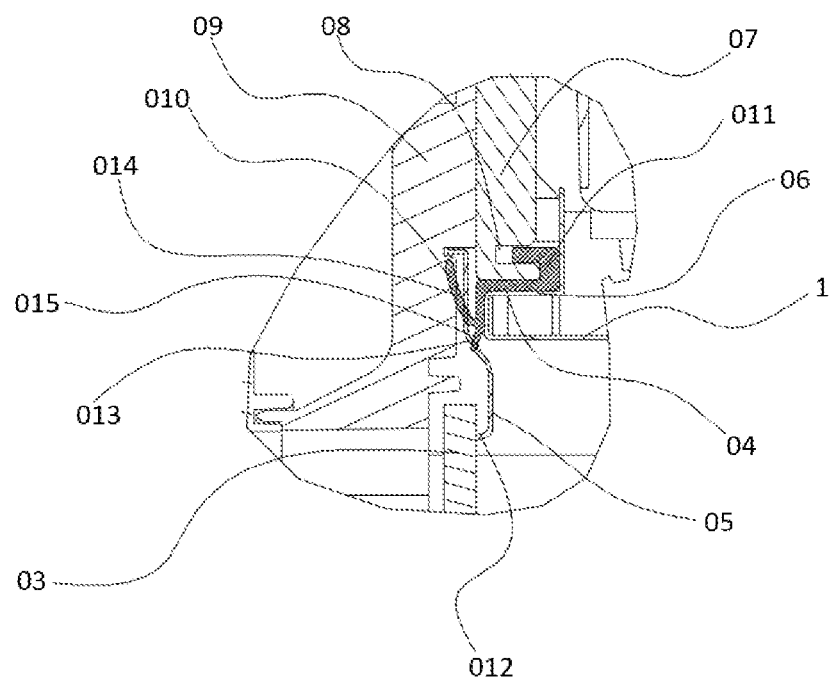
FIG. 7 is an enlarged structural view of part A of FIG. 6.
Figure 8:
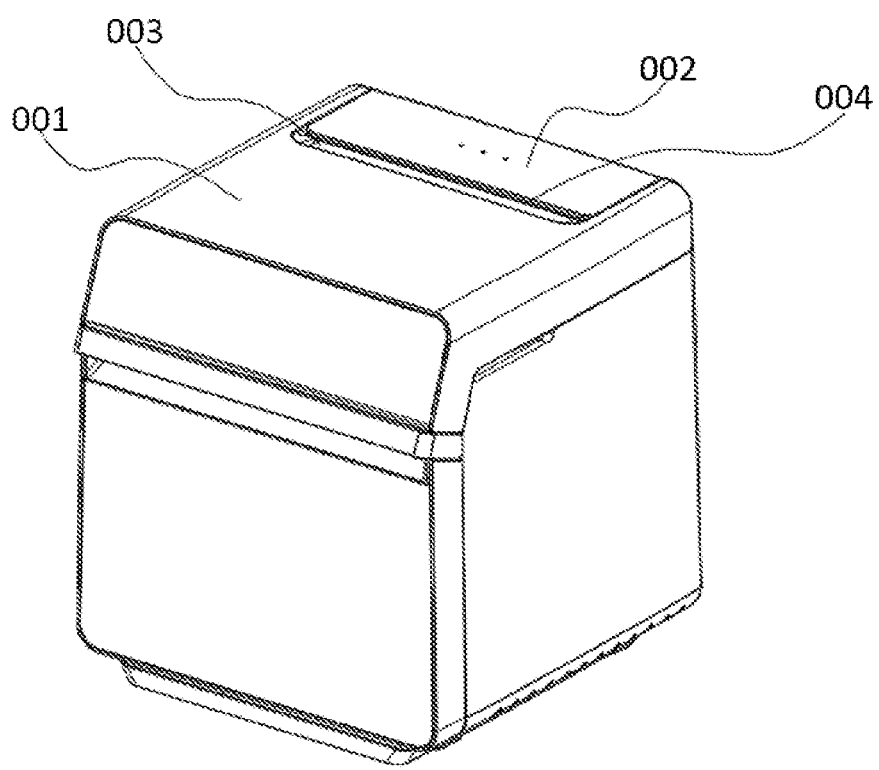
FIG. 8 is an overall perspective structural view of a steam-type air fryer of the present disclosure in which a water tank is in a closed state.
Figure 9:
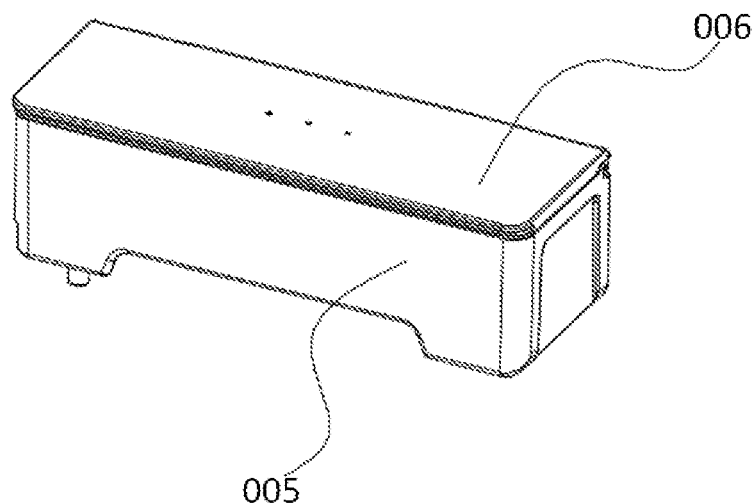
FIG. 9 is a perspective structural view of the water tank of the steam-type air fryer of the present disclosure in which the water tank is in a closed state.
Figure 10:
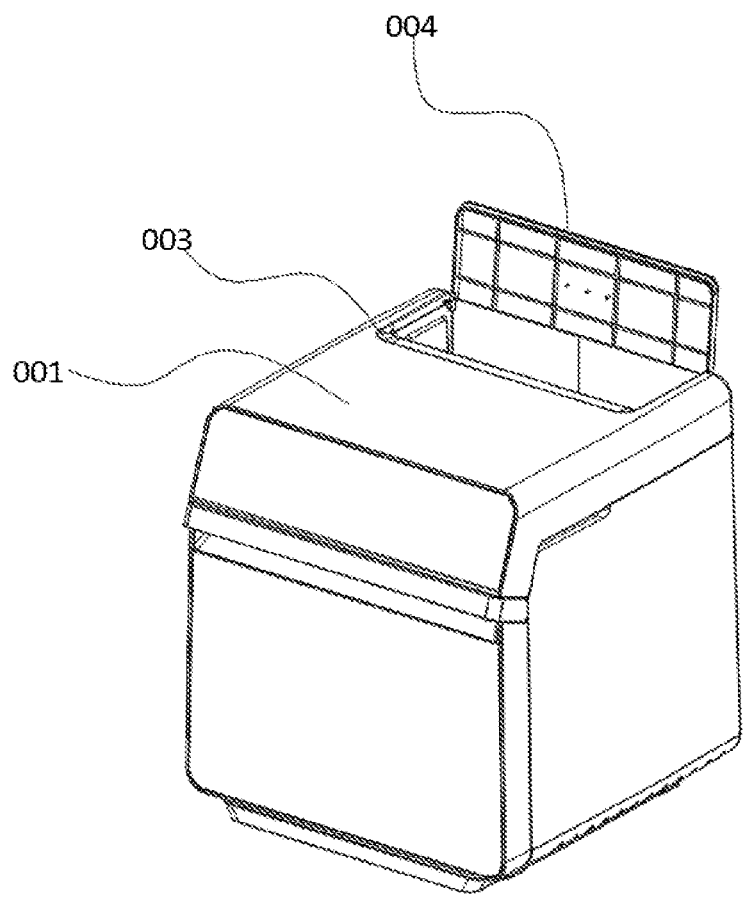
FIG. 10 is an overall perspective structural view of the steam-type air fryer of the present disclosure in which the water tank is in an open state.
Figure 11:
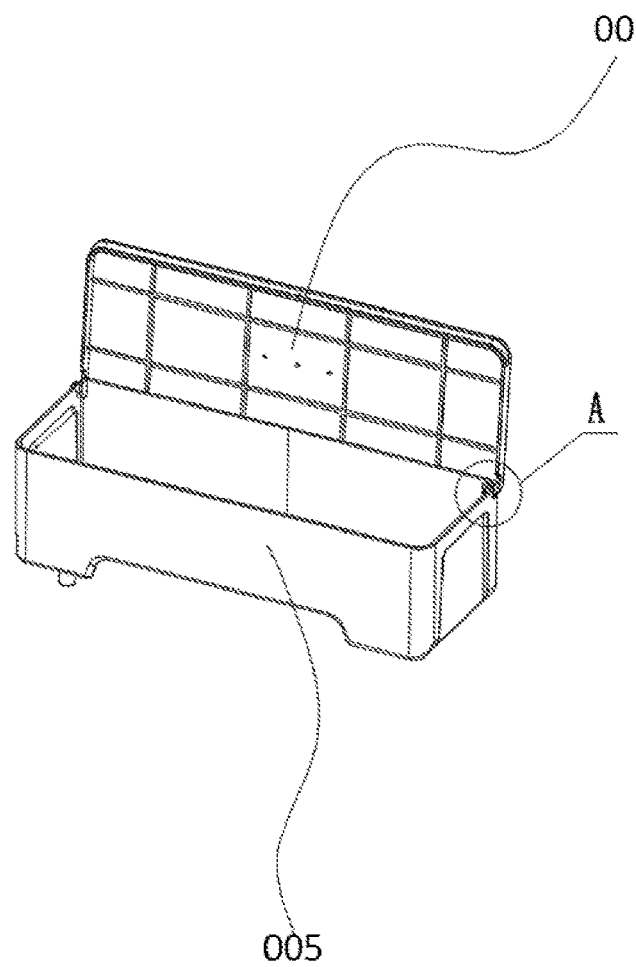
FIG. 11 is a perspective structural view of the water tank of the steam-type air fryer of the present disclosure in which the water tank is in an open state.
Figure 12:
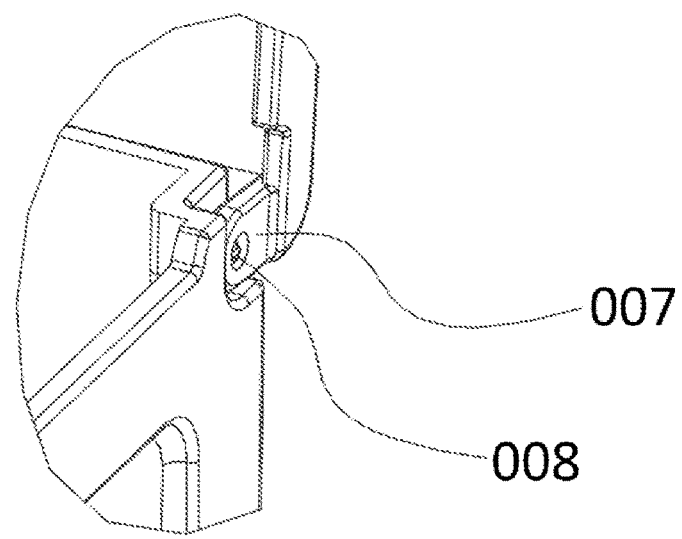
FIG. 12 is an enlarged structural view of part A of FIG. 11.

As shown in FIGS. 6 to 7, the present disclosure provides a door sealing structure for a steam-type air fryer. The air fryer is provided with a chamber 1 in which food can be placed. An openable door panel 02 and a door frame 07 matching the door panel 02 are disposed on a side of the air fryer. An opening through which food is placed and removed is provided in a side of the chamber 1 facing the door panel 02. A second sealing ring 04 is mounted between the door frame 07 and the door panel 02 so that steam in the chamber 1 will not leak from its opening.

Example 4

The second sealing ring 04 includes two sealing lips 010. The second sealing ring includes two sealing lips, which are a first sealing lip 015 extending toward the center of the door panel 02 and a second sealing lip 014 extending toward the edge of the door panel 02, respectively. Both the first sealing lip 015 and the second sealing lip 014 are in contact with the door panel 02 to act as double seals. Structurally, the sections of the two sealing lips 010 are arranged in a trumpet shape, and the sections of the two sealing lips 010 have different lengths.

In order to facilitate mounting of the second sealing ring 04, one side of the second sealing ring 04 is sandwiched between the door frame 07 and the opening of the chamber 1.

The following description is given as an example of a mounting structure for the second sealing ring 04.

A flange portion 06 is provided at the opening of the chamber 1, and one side of the second sealing ring 04 is sandwiched between the flange portion 06 and the door frame 07, wherein the one side of the second sealing ring 04 is provided with a limiting portion 011 having a hook-shaped section, an inner side of the door frame 07 is provided with a limiting groove 08, the limiting portion 011 is sandwiched between the flange portion 06 and the door frame 07, and the limiting portion 011 has an end portion embedded in the limiting groove 08. In this way, the second sealing ring 04 can be clamped and fixed stably, which will not be loosened or displaced due to multiple impacts of the door panel thereon.

Example 5

A transparent window glass panel 03 is disposed in the door panel 02, and the inner side of the door plate 02 is provided with a metal frame 05 for fixing the transparent window glass panel 03.

As a specific structure of the metal frame 05, the metal frame 05 has an outer edge and an inner edge each provided with a folded edge portion 012, the folded edge portion 012 located at the outer edge is engaged with the inner side of the door panel 02, and the folded edge portion 012 located at the inner edge is pressed against the transparent window glass panel 03.

Furthermore, the first sealing lip 015 of the second sealing ring 04 is in hermetical contact with the metal frame 05. The metal frame 05 has a section provided with a bevel portion 013 in its middle portion, so that the overall strength of the metal frame 05 is enhanced. The first sealing lip 015 is hermetically fitted to the bevel portion 013 and can serve the function of isolating heat transfer between the metal frame 05 and the plastic components of the air fryer.

As shown in FIGS. 8 to 12, the present disclosure provides a steam-type air fryer allowing easy addition of water. A water tank 002 is mounted at the top of the air fryer. The water tank 002 includes a water tank body 005 and an openable top cover 006 mounted on the top of the water tank body 005. When it is necessary to add water, the user can fill the water tank 002 with water very easily by directly opening the top cover 006 without removing the water tank 002.

Example 6

One side of the top cover 006 is rotatably connected to the water tank body 005. Specifically, one side of the top cover 006 has both ends provided with hinge bases 007, into which rotating shafts 008 provided at both ends of the water tank body 005 are inserted and connected. The hinge bases 007 each are in a plate shape and have relatively high strength, thus the top cover 006 is rotatable smoothly.

Example 7

A grip flange 004 is provided to protrude from the edge of the other side of the top cover 006. An inwardly recessed portion 003 corresponding to the grip flange 004 is provided in a top surface 001 of the air fryer. When in use, the user may insert his or her fingers into the inwardly recessed portion 003 to act on the grip flange 004, so that the top cover 006 is rotated around the rotating shafts. It is unnecessary to provide a handle on the top cover 006.

When the top cover 006 is closed, the top cover 006 is flush with the top surface 001 of the air fryer, so that the water tank will not protrude from the top surface 001 of the air fryer, and the entire air fryer looks more beautiful.

The water tank 002 is detachably connected to the air fryer and can be wholly removed from the top of the air fryer, in order to facilitate cleaning and replacement of the water tank 002.

Moreover, the water tank body 005 is provided as a transparent structure, in order to quickly know the amount of water remaining in the water tank body 005.

Although the present disclosure has been described above with reference to the embodiments, various modifications may be made thereto and the components therein may be replaced with equivalents without departing from the scope of the present disclosure. In particular, the various features in the embodiments disclosed in the present disclosure may be combined with each other in any manner as long as there is no structural conflict. Those combinations are not exhaustively described in this specification only for the sake of reducing space and saving resources. Therefore, the present disclosure is not limited to the specific embodiments disclosed herein, but includes all the technical solutions falling within the scope of the claims.

INDUSTRIAL APPLICABILITY

In the steam-type air fryer according to the present disclosure, the chamber has an integral welded and sealed structure, and a reliable sealing structure is disposed between the chamber and the air duct plate to ensure airtightness. A second sealing ring is mounted between the door frame and the door panel to achieve a sealed fit therebetween so as to ensure airtightness of the steam-type air fryer. The second sealing ring includes two sealing lips. The two sealing lips are both in contact with the door panel to serve as double seals. The inner side of the door panel includes a transparent window glass panel and a metal frame for fixing the glass, which allows for visualization and easy cleaning. The sealing lip of the second sealing ring is hermetically fitted to the metal frame and can serve the function of isolating heat transfer between the metal frame and the plastic material. The water tank of the steam-type air fryer includes a water tank body and a detachable top cover. The top cover can be opened quickly, so that the water tank can be easily filled with water without being removed. The water tank cover is provided with a rotating shaft structure and is hinged to the water tank body by means of the rotating shaft structure of the water tank. A grip position is provided to protrude from one side of the top cover of the water tank for easy opening of the top cover. In addition, the upper shell of the air fryer is provided with a clearance portion corresponding to the grip position, so that a user can reach into the clearance portion to operate the grip position to easily and quickly open the top cover. The water tank has a detachable structure and can be wholly removed from the upper shell of the air fryer so as to be cleaned easily. Moreover, the water tank body may be provided as a transparent structure, which allows easy and quick observation of the remaining water volume.

What is claimed is:

1. A steam-type air fryer, comprising a main body, wherein a chamber applicable for food to be placed within is disposed in the main body; and a heating element disposed in the main body that is configured to heat water to produce steam which is introduced into the chamber, wherein an air duct plate is disposed on an upper side of the chamber, and a hot air wind wheel and a heating tube are disposed in the air duct plate, wherein the upper side of the chamber has an opening and is hermetically connected with the air duct plate, and a front side of the chamber is open and is hermetically fitted with an openable door panel, so that the entire chamber is formed as an integral sealed structure;

the steam-type air fryer further comprises a door sealing structure comprising a second sealing ring, wherein the openable door panel and a door frame matching the openable door panel are disposed on a side of the air fryer, an opening through which food is placed and removed is provided in a side of the chamber facing the door panel, and the second sealing ring is mounted between the door frame and the door panel, so that steam in the chamber will not leak from its opening; and the steam-type air fryer further comprises a water tank, wherein the water tank is mounted at a top of the steam-type air fryer and comprises a water tank body and an openable top cover located on a top of the water tank body;

wherein a first sealing ring is mounted between the upper side of the chamber and the air duct plate to achieve a sealed connection therebetween;

wherein the second sealing ring comprises two sealing lips, which are a first sealing lip extending toward a center of the door panel and a second sealing lip extending toward an edge of the door panel, respectively, wherein both the first sealing lip and the second sealing lip are in contact with the door panel;

wherein one side of the second sealing ring is sandwiched between the door frame and the opening of the chamber;

wherein a flange portion is provided at the opening of the chamber, and one side of the second sealing ring is sandwiched between the flange portion and the door frame;

wherein one side of the second sealing ring is provided with a limiting portion having a hook-shaped section with an end portion that extends towards the openable door panel, an inner side of the door frame is provided with a limiting groove, the limiting portion is sandwiched between the flange portion and the door frame, and the end portion of the limiting portion is embedded in the limiting groove;

wherein a transparent window glass panel is disposed in the door panel; and wherein an inner side of the door panel is provided with a metal frame for the transparent window glass panel to be fixed.

2. The steam-type air fryer according to claim 1, wherein the chamber comprises a chamber body comprising a top plate, a bottom plate, and side plates, which are integrally molded, wherein a front side of the chamber body forms an open hole that is hermetically fitted with the door panel, a rear side of the chamber body is connected to a back plate in a manner of hermetical welding, and the top plate on an upper side is provided with an upper opening, wherein the upper opening matches a contour of a lower end of the air duct plate.

3. The steam-type air fryer according to claim 1, wherein at least one rib is disposed on each of surfaces of the first sealing ring corresponding to the chamber and the air duct plate.

4. The steam-type air fryer according to claim 3, wherein a chamber step comprising a circular shape is provided along the opening at an upper end of the chamber, an upward flange portion is disposed on an inner side of the chamber step, the first sealing ring is placed on the chamber step and is positionally limited by the upward flange portion, and a lower end of the air duct plate is pressed against the first sealing ring.

5. The steam-type air fryer according to claim 1, wherein an air duct plate step comprising a circular shape is provided along an opening at the lower end of the air duct plate, a downward flange portion is disposed on an outer side of the air duct plate step, and the air duct plate step is pressed against the first sealing ring.

6. The steam-type air fryer according to claim 5, further comprising an upper core, wherein the upper core is provided with a downwardly extending pressure plate, which is pressed against the air duct plate step.

7. The steam-type air fryer according to claim 6, wherein the upper core is connected fixedly to welded nuts on the upper side of the chamber by screws.

8. The steam-type air fryer according to claim 1, wherein an upper end of the chamber has an opening, at which an adhesive layer is disposed to achieve a sealed connection between the chamber and the air duct plate.

9. The steam-type air fryer according to claim 1, wherein the metal frame has an outer edge and an inner edge each provided with a folded edge portion, the folded edge portion located at the outer edge is engaged with the inner side of the door panel, and the folded edge portion located at the inner edge is pressed against the transparent window glass panel.

10. The steam-type air fryer according to claim 9, wherein the first sealing lip of the second sealing ring is in hermetical contact with the metal frame.

11. The steam-type air fryer according to claim 1, wherein one side of the top cover is rotatably connected to the water tank body.

12. The steam-type air fryer according to claim 11, wherein one side of the top cover has ends each provided with a hinge base, into which a rotating shaft provided at each end of the water tank body is inserted.

13. The steam-type air fryer according to claim 11, wherein a grip flange is provided to protrude from an edge of the top cover which corresponds to a side of the top cover, and an inwardly recessed portion corresponding to the grip flange is provided in a top surface of the air fryer.

* * * * *